Oct. 21, 1930.  I. L. STERN  1,778,736

PAVEMENT

Filed April 6, 1925

Witness:

Inventor
Irving L. Stern
By Paul Carpenter, Atty.

Patented Oct. 21, 1930

1,778,736

UNITED STATES PATENT OFFICE

IRVING L. STERN, OF CHICAGO, ILLINOIS, ASSIGNOR TO CHICAGO ART MARBLE COMPANY, OF CHICAGO, ILLINOIS, A CORPORATION OF ILLINOIS

PAVEMENT

Application filed April 6, 1925. Serial No. 20,992.

This invention relates broadly to pavements, and more particularly to improvements in ramps, that is, inclined planes now commonly employed in building structures, roadways, etc., to supplant stairs and steps.

In the past, where ramps or inclined roadways, sidewalks or the like have been employed, the design of such ramps has been confined to gradual rises, for the reason that in inclement weather, rain, snow and ice collect on these ramps and passage over them by pedestrians is made extremely dangerous, due to lack of proper footing, and the factor of safety therefore demands that the incline be relatively gentle. Furthermore, drainage has been difficult to accomplish, the tendency of water falling on the ramp or draining thereon being to collect at the bottom of the ramp, thus making the lower approach uncomfortable and dangerous. It will be understood, therefore, that these considerations have demanded that the angle of the ramp to the horizontal be relatively slight, thus causing the ramp to occupy a considerable space, and in some cases, due to lack of such space, to entirely prohibit the use of a ramp.

The principal object of this invention is to provide a ramp or inclined roadway which affords a tread surface which may be installed at points where an ordinary ramp cannot be employed with safety; to provide a ramp which affords an inclined tread surface which includes tread portions affording substantially level tread surfaces which assure a safe footing for pedestrians; to provide a tread surface which may be safely employed when installed at a steeper grade than ordinarily possible within safety; to provide a ramp tread surface which will be adequately drained at all times, and on which water or the like will not remain and wherein moisture on the tread surface thereof is prevented from collecting upon or at the bottom of the ramp for any appreciable period of time; and to provide a ramp or other tread surface including portions which afford double contact surfaces, so that traction is increased and safe footing assured.

Figure 1:
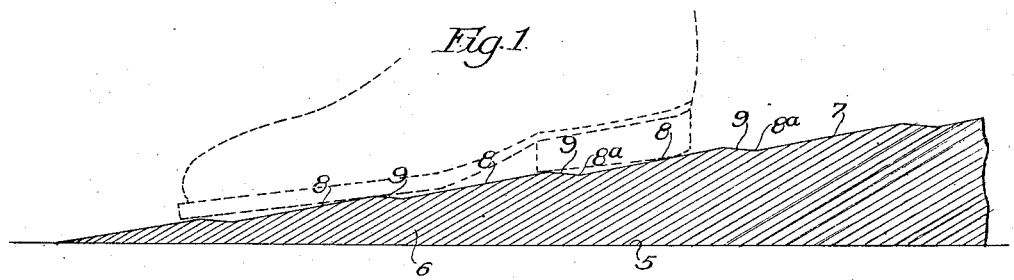
Figure 1 is a vertical sectional view of a roadway constructed in accordance with my invention.

Referring now particularly to the drawing, and first to Figure 1, an inclined plane or ramp is shown, this being built upon a horizontal surface 5, and the roadway may be formed of a solid mass 6 of concrete or the like.

The upper or tread surface 7 of the roadway is inclined in a plane which may or may not be continuously at the same angle and includes a series of tread sections or areas 8 which are disposed in spaced relation and transversely of the longitudinal axis of the roadway, said areas 8 being connected by and serving to connect the intermediate inclined surfaces 9 to form a substantially continuous roadway. It will be observed that the surface 8 is contiguous with the upper edge of the surface 9, and contiguous with the lower edge of the next adjacent lower surface 9, so that a substantially continuous tread surface is afforded.

The sections 9 are all disposed in substantially parallel planes, where the incline is of the same grade throughout, and the tread sections 8 are similarly in parallel planes, the tread sections 8 and 9 being angularly related as shown, that is, the sections 8 being slightly inclined in the opposite direction to the surfaces 9, thus affording a series of transverse substantially horizontal, though in reality, slightly inclined tread surfaces.

Figure 3:
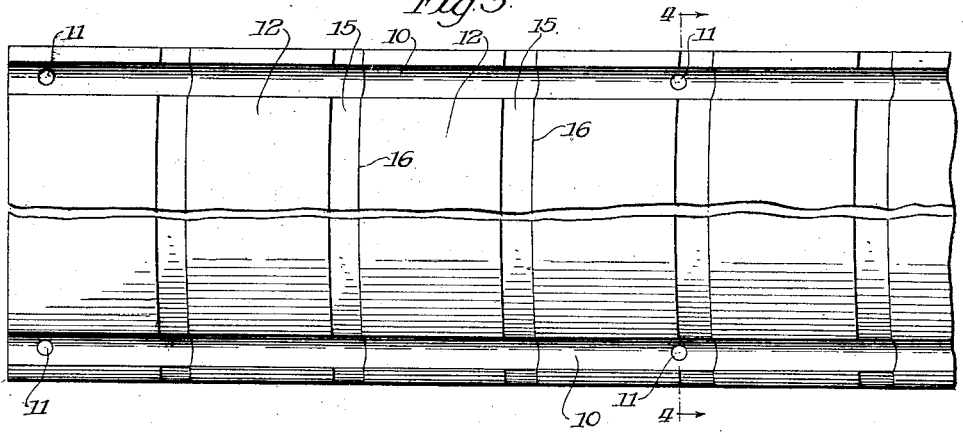
Figure 3 is a plan view.
Figure 4:
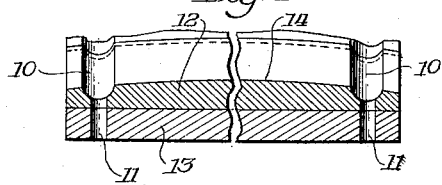
Figure 4 is a fragmentary transverse sectional view taken on the line 4—4 of Figure 3, looking in the direction indicated by the arrows.

The angularity of the surfaces 8 to the surfaces 9 is such that said surfaces 8 are slightly inclined with respect to the horizontal surface 5 in order to afford transverse grooves $8^a$ which serve to conduct moisture toward the gutters 10—10 shown in Figures 3 and 4. This affords ample drainage for the ramp, the gutters communicating with drain openings 11—11 disposed at necessary points in said gutters. In this manner the collection of moisture in any form for any appreciable length of time upon the ramp is avoided.

In order to assist in the drainage by the grooves 8ª the general configuration in cross-section may be similar to that shown in Figure 4, the roadway having its surface raised gently toward the center.

In installing a roadway of the kind shown, the treads 8 may be relatively spaced at any desired distance, such as approximately the length of a normal average stride or step, or less, and thus the foot, as shown in Figure 1, in engaging the ramp will have contact with the surface 8, or a part thereof, at more than one point, thereby further increasing traction and preventing slipping.

The distance between the treads 8 and their size and angularity will be best determined by experiment and proper design in a given situation, but the width of the treads 8 should be at least sufficient to afford a proper contact of the foot therewith and the angularity of the surfaces 8 enough to afford proper drainage facilities.

Figure 2:
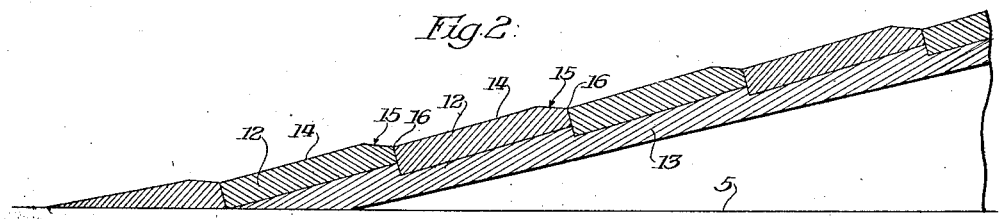
Figure 2 is a vertical sectional view of an alternative form of the invention.

The roadway built in accordance with the present invention may be constructed as shown in Figure 1, or may be constructed of suitable blocks 12 as shown in Figure 2, the blocks being disposed upon a concrete or similar base 13.

These blocks 12 are placed abutting each other, end to end, the tread surfaces 14 of each block being substantially parallel with but disposed above the plane of the next adjacent block as the ramp rises, the upper end of a block being beveled off to afford the tread surface 15, this surface terminating at one end flush and contiguous with the upper edge of the next adjacent block as indicated at 16 to afford the tread surface a transverse draining groove. Each block may be provided along its edges with sections of the gutters, or these gutters may be formed in the base 13 as desired.

The material employed in making the roadway in either of its forms shown may be any approved roadway material, but in one installation I have employed a composition including cement, marble chips, and an abrasive which may be a carbon-corundum electrolytic product, but it will be understood that the present invention has to do particularly with the contour of the roadway surface.

Having thus described my invention and illustrated its use, what I claim as new and desire to secure by Letters Patent is:

1. In an inclined roadway or walk formed of blocks, each having its tread surface formed of two sets of plane surfaces inclined to each other and to the general plane of the roadway so as to intersect each other in lines transverse to the line of the roadway and provide a series of alternate long and short tread surfaces, with the longer tread surfaces sloped towards the lower end of the roadway and the short tread surfaces substantially horizontal, slightly inclined away from the lower end of the roadway, whereby a safe and efficient anti-slipping traction surface is provided.

2. In an inclined roadway or walk having its tread surface formed of two sets of plane surfaces inclined to each other and to the general plane of the roadway so as to intersect each other in lines transverse to the line of the roadway and provide a series of alternate long and short tread surfaces, with the longer tread surfaces sloped towards the lower end of the roadway and the short tread surfaces substantially horizontal, slightly inclined away from the lower end of the roadway, whereby a safe and efficient anti-slipping traction surface is provided.

In testimony whereof I have hereunto signed my name.

IRVING L. STERN.